United States Patent
Strogov et al.

(10) Patent No.: US 12,242,606 B2
(45) Date of Patent: Mar. 4, 2025

(54) FORENSIC ANALYSIS ON CONSISTENT SYSTEM FOOTPRINTS

(71) Applicant: Acronis International GmbH, Schaffhausen (CH)

(72) Inventors: Vladimir Strogov, Singapore (SG); Sergey Ulasen, Singapore (SG); Seguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 251 days.

(21) Appl. No.: 17/656,994

(22) Filed: Mar. 29, 2022

(65) Prior Publication Data

US 2023/0315848 A1 Oct. 5, 2023

(51) Int. Cl.
*G06F 21/56* (2013.01)
*G06F 21/57* (2013.01)

(52) U.S. Cl.
CPC .......... *G06F 21/564* (2013.01); *G06F 21/577* (2013.01); *G06F 2221/033* (2013.01)

(58) Field of Classification Search
CPC . G06F 21/564; G06F 21/577; G06F 2221/033
See application file for complete search history.

(56) References Cited

U.S. PATENT DOCUMENTS

| | | | |
|---|---|---|---|
| 7,571,482 B2 | 8/2009 | Polyakov et al. | |
| 7,647,636 B2 | 1/2010 | Polyakov et al. | |
| 8,578,174 B2 * | 11/2013 | Jakobsson | G06F 21/64 713/189 |
| 8,584,241 B1 * | 11/2013 | Jenks | G06F 21/566 726/23 |
| 9,245,114 B2 | 1/2016 | Thomas et al. | |
| 9,672,355 B2 * | 6/2017 | Titonis | H04W 12/12 |
| 9,721,089 B2 * | 8/2017 | Krishnan | G06F 21/50 |

(Continued)

FOREIGN PATENT DOCUMENTS

| CN | 110618854 B | 4/2022 |
|---|---|---|
| CN | 113010268 B | 10/2022 |

(Continued)

*Primary Examiner* — Techane Gergiso
(74) *Attorney, Agent, or Firm* — ESPE Legal Consultancy FZ-LLC

(57) ABSTRACT

Forensic analysis on consistent system footprints relates to a system and method for rootkit detection based on forensic analysis performed on consistent system footprints, such as application events, application network communications and application files. The system includes a security system periodically monitoring one or more applications of a computing system. The security system includes a threat detection unit for collecting and storing system memory dumps, a machine learning module trained on clean and infectious memory dump, a similarity scanner to identify similarity between suspicious memory block and consistent system footprints, and a forensic analyzer to perform forensic analysis and detect infection, if any, based on the similarity found. The suspicious memory block is identified by the threat detection unit based on the analysis performed by the machine learning model. Upon rootkit detection an alert and forensic analysis report are generated.

20 Claims, 5 Drawing Sheets

(56) References Cited

U.S. PATENT DOCUMENTS

| | | | |
|---|---|---|---|
| 9,996,694 B2* | 6/2018 | Sethumadhavan | G06F 21/52 |
| 10,268,567 B2* | 4/2019 | Marron | G06F 11/3628 |
| 10,320,820 B2* | 6/2019 | Lord | H04L 63/1416 |
| 10,417,420 B2* | 9/2019 | Zhang | G06F 21/562 |
| 10,528,738 B2* | 1/2020 | Spernow | G06F 21/562 |
| 10,530,802 B2* | 1/2020 | Thomas | G06F 21/565 |
| 10,581,899 B2* | 3/2020 | Ranum | G06F 21/564 |
| 10,764,313 B1* | 9/2020 | Mushtaq | G06N 20/00 |
| 10,848,519 B2* | 11/2020 | Howard | G06N 3/045 |
| 11,165,815 B2* | 11/2021 | Trost | H04L 63/1416 |
| 11,227,056 B2* | 1/2022 | Tang | G06F 12/1475 |
| 11,258,805 B2* | 2/2022 | Nguyen | H04W 12/12 |
| 11,271,907 B2* | 3/2022 | Xiao | H04L 43/028 |
| 11,604,878 B2* | 3/2023 | Hu | G06F 21/53 |
| 11,620,384 B2* | 4/2023 | Smith | G06N 7/01 726/23 |
| 11,663,329 B2* | 5/2023 | Givental | G06F 21/554 726/23 |
| 11,757,936 B2* | 9/2023 | Xiao | H04L 63/0227 726/22 |
| 2004/0049693 A1 | 3/2004 | Douglas | H04L 63/1408 726/23 |
| 2007/0162975 A1 | 7/2007 | Overton et al. | |
| 2007/0174910 A1* | 7/2007 | Zachman | G06F 21/79 726/18 |
| 2008/0216176 A1* | 9/2008 | Lomont | G06F 21/57 726/24 |
| 2008/0320594 A1* | 12/2008 | Jiang | G06F 21/566 726/24 |
| 2009/0164522 A1* | 6/2009 | Fahey | H04L 63/30 |
| 2009/0165135 A1* | 6/2009 | Lomont | G06F 21/566 726/22 |
| 2012/0079596 A1* | 3/2012 | Thomas | H04L 63/1433 726/24 |
| 2013/0097706 A1* | 4/2013 | Titonis | G06F 21/566 726/22 |
| 2014/0047544 A1* | 2/2014 | Jakobsson | G06F 21/566 726/23 |
| 2014/0123280 A1* | 5/2014 | Kedma | G06F 11/3003 726/23 |
| 2015/0089655 A1 | 3/2015 | Choi et al. | |
| 2015/0135262 A1* | 5/2015 | Porat | G06F 21/552 726/1 |
| 2015/0242626 A1* | 8/2015 | Wang | G06F 21/577 726/23 |
| 2018/0300197 A1* | 10/2018 | Marron | G06F 11/0778 |
| 2020/0412767 A1* | 12/2020 | Crabtree | H04L 63/1441 |
| 2021/0021616 A1* | 1/2021 | Shabtai | H04L 63/145 |
| 2021/0216667 A1 | 7/2021 | Strogov et al. | |
| 2021/0326438 A1* | 10/2021 | Dichiu | G06F 21/552 |
| 2021/0344686 A1* | 11/2021 | Ranum | H04L 63/1433 |
| 2022/0222338 A1* | 7/2022 | Gupta | G06F 21/554 |
| 2022/0321540 A1* | 10/2022 | Loman | H04L 63/0414 |
| 2023/0409715 A1* | 12/2023 | Nissim | G06F 9/45533 |

FOREIGN PATENT DOCUMENTS

| | | |
|---|---|---|
| CN | 112560018 B | 10/2023 |
| IN | 202121039124 | 8/2021 |
| KR | 101824583 B1 | 2/2018 |
| KR | 20190109203 A | 9/2019 |

* cited by examiner

FORENSIC ANALYSIS ON CONSISTENT SYSTEM FOOTPRINTS

FIELD OF THE INVENTION

The present disclosure generally relates to computer security systems. In particular, the present disclosure relates to a system to perform forensic analysis on consistent system footprints, such as network logs, operation files and event logs, for identifying the rootkit infection present in a computing system.

BACKGROUND OF THE INVENTION

Threat posed by malicious software, also known as malware, harms the computer systems to a great extent. Malware may come in many forms and behavior that present a serious risk to millions of computer users, making them vulnerable to loss of data, identity theft, and loss of productivity, among others. To prevent malware attacks, many malware detection systems have been developed and implemented worldwide. Many forms of the malware can be detected even before infecting the computer system, and can be removed, thus protecting the computer systems from the malware attack. One of the most difficult malwares to detect is a rootkit.

The rootkit is malicious software used to install and hide other malicious programs inside a computer system. Standard anti-virus or anti-spyware often fail to detect the rootkits as the rootkits are programmed such that those are very difficult to detect through standard scans. The rootkits can be categorized as one of the following five types depending upon the location in the computing system in which the rootkit executes: (1) firmware, (2) hypervisor, (3) kernel, (4) library, and (5) application.

Anti-malware or rootkit detection software, currently present in the art, mainly use signatures generated from rudimentary heuristic analysis to identify and defend against attacks. Signature based anti-malware systems may be proved ineffective in detecting previously unknown variants or new malware whose signature is unknown. Malware cannot be detected unless a huge chunk of data is collected from various files and events, and then, analyze the data against a database of the known signatures. Upon detection, the alert can be generated.

Due to the volume and increasing sophistication of malware, malware analysts must be prioritized based on the prevalence of the infection, the rate at which it spreads, the security impact, and the effort required to remove it. Malware detection, in few examples, may follow a three-step technique, which includes surface analysis, runtime analysis, and static analysis. If the malware detection analysis is performed using this process manually, it requires high skills, time and resource expenditure cost. Static analysis is the most effective technique for determining what the malware actually does, but this level of analysis is typically reserved for the highest priority malware because it is very expensive in terms of effort and resources.

Additionally, the manual analysis of malware detection may further get difficult due to use of obfuscation techniques, such as binary packers, encryption, and self-modifying code by malware writers. When conducting a static analysis, the malware analyst relies on their individual experience. The analysts categorize samples into families so that new variants can be compared to malware that they have seen before.

As an alternative to heuristic and signature-based based techniques, few rootkits detecting and preventing techniques can be used which are based upon determining the modification of the computing system memory and analyzing a memory dump. For example, the rootkit detecting and preventing tool may be configured to obtain and analyze the memory dump of the data maintained by the operating system on a target computer. In this instance, the kernel debugging facilities extract relevant information from the memory dump that is analyzed either on the computing system or a virtual machine to determine the extent to which a network of computers has been infected with the rootkit. However, in this technique, unordered collection and analysis of dumps may require a large amount of memory storage for capturing and storing system dumps, and it may become more difficult to analyze the system dumps with the required accuracy.

A person skilled in the art can construe here that the forensic static analysis can be a straight-forward and effective process, however, manually conducted analysis requires highly skilled malware analysts which renders the process expensive and subjective to the skill set of the analyst. The forensic tools can be used to automate the process, and a forensic agent can be implemented to acquire data from the computing system. Yet, analysis of large volumes of data and implementation of the agent at each computing system remains a problem. Further, forensic acquisition and analysis of stored data does not provide live memory or current state of a running operating system.

SUMMARY OF THE INVENTION

As an alternative, the live memory or current state of the running operating system can be captured in memory dumps and contents of the cached file from the dump can be extracted later. The memory dumps can be utilized to train a machine learning model that can differentiate various input data and determine the relationship between various input data. Utilization of the machine learning model can eliminate the need for manual analysis.

The system acquires system dumps to train the machine learning model and stores the system dumps so that the content can be retrieved later, configures the machine learning model can segregate suspicious data so that forensic analysis can be performed only on compartmentalized suspicious data, instead of entire chunk of acquired system data.

The present disclosure generally relates to a computer security system. In particular, the present disclosure relates to a system to perform forensic analysis on consistent system footprints, such as network logs, operation files and event logs, for identifying the rootkit infection present in a computing system.

The system and methods of the present disclosure mainly include a security system, implemented on a computing system, to identify rootkit infection by performing forensic analysis on consistent system footprints, such as operation files, network logs, and event logs. The security system consists of a threat detection unit based on a machine learning model which is trained on various data inputs, such as differential memory dumps and system data acquired from event logs, operational files, and network logs. The threat detection unit can identify a suspicious data block by analyzing the system dump. Forensic analysis can be performed on the suspicious data blocks to identify a threat storing a rootkit code for determining presence of the rootkit. A forensic analyzer can analyze the data, compartmentalized in textual representation or binary representation, to determine if the suspicious data block is infected with the rootkit or not.

With the present disclosure, as the person skilled in the art can understand, utilization of a machine learning model trained on system memory dumps allows the effective analysis and storage of the system memory dumps, and extraction of the content of the memory dumps or current state of the operating system. Further, forensic analysis is performed on suspicious data blocks only, which are already broken down into compartmentalized sections, such as textual or binary representation. This results in an efficient, time and cost-effective rootkit detection system. Maintaining log of the network, events, and files further allows to identify the process which is a root cause of the infection virtually instantaneously.

In an embodiment, the hardware processor may produce at least a first memory dump and a second memory dump. In an implementation, the first memory dump corresponds to clean memory dump, and the second memory dump corresponds to a malicious memory dump.

In an embodiment, the security system is communicatively coupled to the hardware processor to receive data related to application activity events being performed on the computing system, application network logs, and application operation files. The security system includes a consistent database, a threat detection unit, a machine learning model, a similarity scanner, and a forensic analyzer.

In an embodiment, the consistent forensic database is configured to store one or more application activity events, the application network connections, and application operation files of the computing system. Monitoring priority is allotted to the malicious applications or to the applications exhibiting malicious behavior.

In an embodiment, the threat detection unit is implemented for analyzing a system dump. The system dump is a process of capturing the all-information content in RAM and stores it in a storage device. The information content can be accessed later, particularly, in case of application or system crash.

In one implementation, the threat detection unit collects entities including the application activity events, the application network connections, and the application file operations.

In an embodiment, the machine learning model is configured to receive training data related to at least one of the application network connection logs, the application event activity log, and the application file operation log from infected and non-infected system states for training purposes. These two data sets are compared to learn a pattern of abnormality or presence of the rootkit. The machine learning model is based on an artificial neural network that consists of two identical neural subnets with the same sets of weights. The network compares vectors of features of two objects in order to determine similarities of differences between the two or more vectors. In one implementation, the machine learning model is trained on a collection of known rootkits and clean files corresponding to memory dumps of uninfected systems. As a result of the training, the machine learning model can differentiate the two or more vectors of two identical neural subnets, such as clean memory dump and infected memory dump. Based on the differentiation, the machine learning model is configured to identify whether the data block is suspicious or not.

In an embodiment, the machine learning model trains on a collection of known malwares, corresponding to a rootkit family, and clean files, corresponding to one or more memory dumps of an uninfected computing system.

In an embodiment, a similarity scanner is configured to receive the at least one suspicious block from the threat detection unit, and compare the data related to the at least one suspicious block with data related to at least one of the application network connections, the application events, and the application files to find data objects that are storing rootkit infection code.

In an embodiment, the security system includes a forensic analyzer configured to perform analysis on at least one suspicious block to identify a thread storing the rootkit code.

In an embodiment, the security system analyses operational processes and network connections that may have been initiated or responded to the thread to identify infected processes.

It should be noted that the system described above is operated by one or more method steps implemented in and executed by the system comprising a hardware processor. Alternatively, the method steps may be implemented using computer executable instructions of a non-transitory computer readable medium.

DETAILED DESCRIPTION OF THE INVENTION

The embodiments will now be described more fully hereinafter with reference to the accompanying figures, in which preferred embodiments are shown.

To provide an overall understanding of the systems and methods described herein, certain illustrative embodiments will now be described, including systems and methods for storing trusted data at a cloud storage service. However, it will be understood that the systems and methods described herein may be adapted and modified as is appropriate for the application being addressed and that the systems and methods described herein may be employed in other suitable applications, and that such other additions and modifications will not depart from the scope thereof. A server or system as used in this description may be a single computing device or multiple computing devices working collectively and in which the storage of data and the execution of functions are spread out amongst the various computing devices.

Computer programs described in some embodiments of the present invention are stand-alone software entities or sub-entities (e.g., subroutines, code objects) of other computer programs. A target object is generally a file or a process residing on a client computer system. Computer readable media encompass non-transitory media such as magnetic, optic, and semiconductor storage media (e.g., hard drives, optical disks, flash memory, DRAM), as well as communications links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

Aspects of the system and methods described herein provide a system to detect rootkit infection, based on forensic analysis performed on consistent system footprints. In general, rootkit is regarded as one the most difficult malware to detect. It is impossible to detect rootkit infection during the injection process. Therefore, it is necessary to identify the threat during its execution. The present disclosure collects one or more memory dumps and analyses the memory dump in conjunction with application data. A machine learning model, which is trained on the collection of clean files and known threats, is configured to differentiate between a clean memory dump and an infected memory dump. Based on the differentiation, the system can determine whether the system is infected or not.

Figure 1:
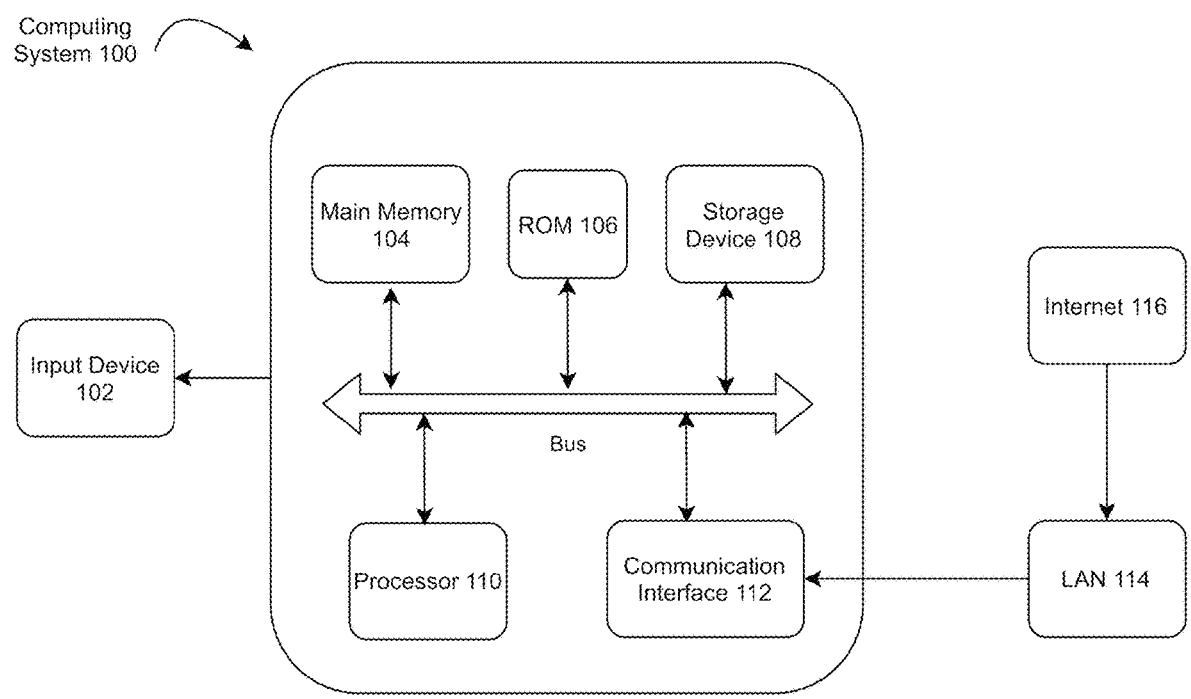
FIG. 1 shows a block diagram that illustrates an environment for a system implementation, in accordance with an embodiment.

FIG. 1 shows a block diagram that illustrates an environment for a system implementation. The system includes a computing system connected to the Internet. Such configuration is typically used for computers (hosts) connected to the Internet and executing a server or a client (or a combination) software. The computing system may include a bus, an interconnect, or other communication mechanism for communicating information, and a processor 110, commonly in the form of an integrated circuit, coupled to the bus for processing information and for executing the computer executable instructions. The computing system may also include a main memory 104, such as a Random Access Memory (RAM) or other dynamic storage device, coupled to the bus for storing information and instructions to be executed by processor 110. The main memory is also used for storing temporary variables or other intermediate information during execution of instructions to be executed by processor 110. The computing system may further include a Read Only Memory (ROM) 106 (or other non-volatile memory) or other static storage device coupled to the bus for storing static information and instructions for processor 110. A storage device 108, that may be a magnetic disk or optical disk, such as a hard disk drive (HDD) for reading from and writing to a hard disk, a magnetic disk drive for reading from and writing to a magnetic disk, or an optical disk drive (such as DVD) for reading from and writing to a removable optical disk, is coupled to the bus for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program models and other data for the general-purpose computing devices.

Typically, the computing system includes an Operating System (OS) stored in a non-volatile storage for managing the computer resources and provides the applications and programs with an access to the computer resources and interfaces. An operating system commonly processes system data and user input and responds by allocating and managing tasks and internal system resources, such as controlling and allocating memory, prioritizing system requests, controlling input and output devices, facilitating networking and managing files.

Processor 110 generally comprises an integrated circuit or any other electronic device (or collection of electronic devices) capable of performing an operation on at least one instruction, including, without limitation, a microprocessor (μP), a microcontroller (μC), a Digital Signal Processor (DSP), or any combination thereof. Processor 110 may further be a Reduced Instruction Set Core (RISC) processor, a Complex Instruction Set Computing (CISC) microprocessor, a Microcontroller Unit (MCU), or a CISC-based Central Processing Unit (CPU).

A memory can store computer programs or any other sequence of computer readable instructions, or data such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively, or in addition, a memory may be in the form of a packaged functional assembly of electronic components (model). Such model may be based on a Printed Circuit Board (PCB) such as PC Card according to Personal Computer Memory Card International Association (PCMCIA) PCMCIA 2.0 standard, or a Single In-line Memory Model (SIMM) or a Dual In-line Memory Model (DIMM), standardized under the JEDEC JESD-21C standard. Further, a memory may be in the form of a separately rigidly enclosed box such as an external Hard-Disk Drive (HDD).

The computing system commonly includes a communication interface 112 coupled to the bus. Communication interface 112 provides a two-way data communication coupling to a network link that is connected to a Local Area Network (LAN). For example, the communication interface may be an Integrated Services Digital Network (ISDN) card or a modem to provide a data communication connection to a corresponding type of telephone line.

Figure 2:
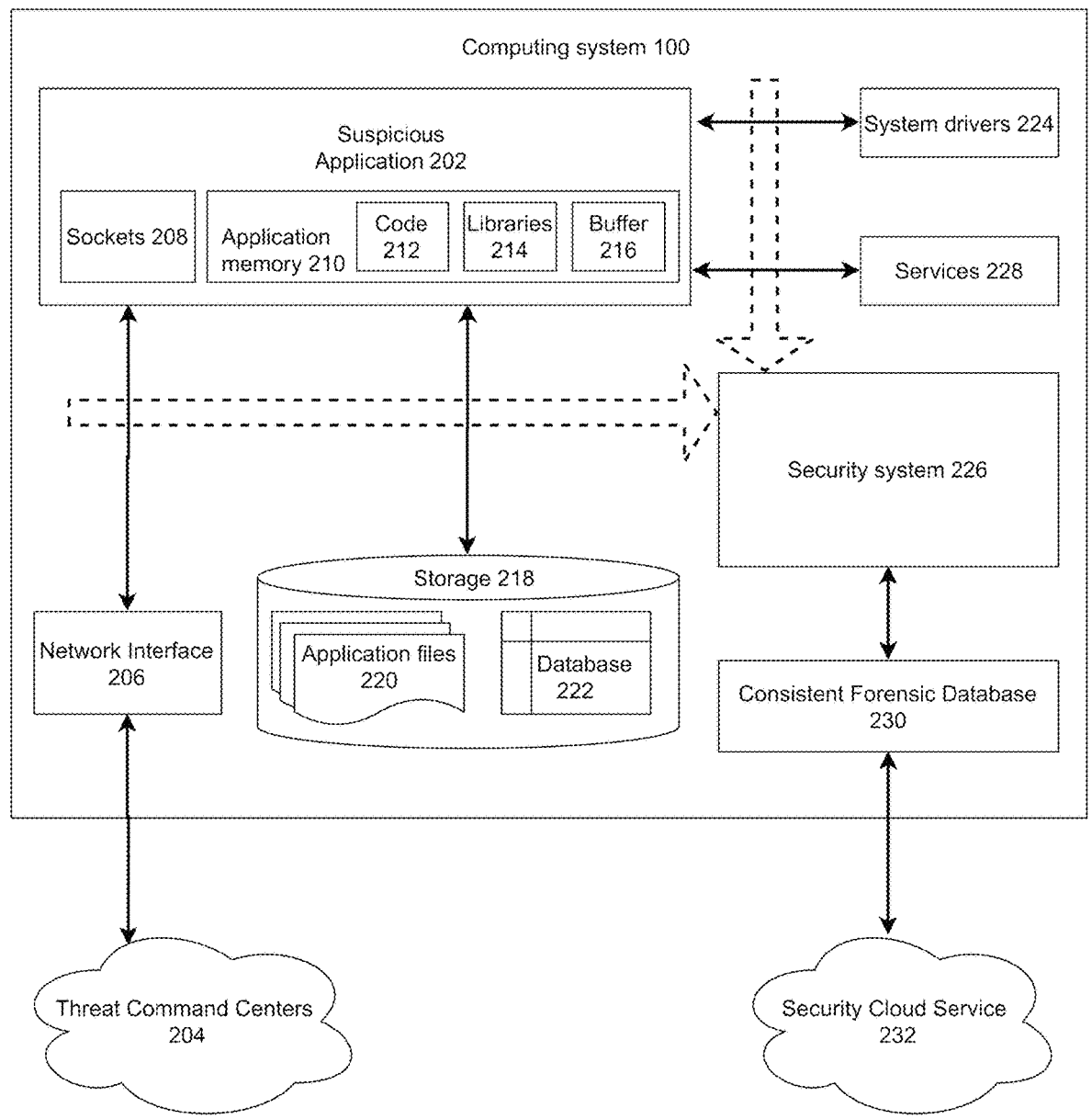
FIG. 2 describes a generic block diagram of the computing system having a security system implemented on it, in accordance with the embodiment.

FIG. 2 describes a functional block diagram of computing system 100 having a security system 226 implemented on it. In one implementation, security system 226 is implemented on a virtual machine. Computing system 100 may include one or more system applications. Application unit 202 may get into communication with a threat command center 204 through one or more network interfaces 206. Threat command center 204 is a collection of malwares, threats, viruses, rootkit malfunctions and similar kind of program file that may cause the malfunction in computing system 100. Such malware may infect at least one application 202 and cause malfunctioning. Such applications are referred to as infected applications, or if the cause of the malfunction is not determined, the application unit 202 is treated as a suspicious application 202 and analyzed further.

FIG. 2 shows application unit 202, which is designed and configured to manage the resources of the system, such as memory and process management, security, and the like. The applications are specifically configured to implement and execute the user's requirement for performing a specific task. Application code 212 may be written in a low-level language like a machine or assembly language. Computing system 100 may implement one or more types of applications. The applications can be broadly categorized into different types. Examples of the broad classification of general application may include, but may not be limited to, Web browsers, Presentation software, Spreadsheet software, Graphic software, Word processors, Database software, Multimedia software, Education software, Information software, and Content access software.

According to an embodiment, application 202 may include a socket 208 and an application memory 210. Socket 208 is a software entity that provides basic building blocks for inter-process communications, and functions as an end-point of communication between application processes. Socket 208 uniquely identifies a connection between two communicating sides by an identifier including a network address and a network port, wherein the network address refers to address of an entity creating socket 208, e.g., an application process, and the network port refers to a communications port of this entity as known to other entities in the network. Sockets may generally be created by the underlying operating system (not shown) in the context of which application is running. Once a socket 208 is created, the application process may connect with another socket 208 associated with another application process, and thus establish a network connection with the other application process. Once the socket 208 connection has been established between two applications or two application processes, messages and data can be sent between the applications or processes using a selected network transmission protocol. In other words, a socket 208 is a component of an application program interface (API) that allows applications running on data processing systems in a network to communicate with each other. It identifies a communication end point in a network and can be connected to other socket 208s in the network. An application 202 or process places data in a first socket that it has created and sends the data to another socket connected to the first socket, thereby transmitting data to another application or process that has established the second socket. These sockets 208 hide the protocol of the next lower layer in the underlying network architecture from the processes when performing the communication between the processes.

As described, socket 208 is configured for establishing communication with other application processes. According to the same embodiment, application memory 210 is implemented and compartmentalized to provide one or more memory sections for storing code 212, libraries 214, and buffer 216. In one implementation, application memory 210 can be magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Application memory 210, in accordance with the embodiment, stores code 212. Typically, codes, which may be referred to as an application program, are constructed by combining segments of program code 212 obtained from different sources. Library 214 stores predefined instructions required for execution of functions associated with the application. For example, library 214 may include instructions for data exchange with client devices using one or more sockets 208 along with enabling data exchange with HTTP proxy using multiple pointers.

According to an embodiment, application 202 communicates with threat command center 204 via network interface 206. Computing system 100 includes one or more network interfaces 206 or network adapters for communicating with the remote computers via one or more networks, such as a local-area computer network (LAN), a wide-area computer network (WAN), an intranet, and the Internet. Examples of the network interface may include an Ethernet interface, a Frame Relay interface, SONET interface, and wireless interfaces.

According to an embodiment, storage is provided to store one or more application files 220 and to provide database 222 for the application.

According to an embodiment, each of the one or more applications is connected to system drivers 224, referred to as a device driver interchangeably. The device driver provides a programmable software interface to hardware devices, enabling operating systems and the one or more applications to access hardware functions without needing to know precise details about the hardware being used.

In one implementation, the device driver may communicate with the computer hardware by computer subsystem or computer bus connected to the hardware. In another implementation, device drivers 224 communicate with one or more peripheral devices connected to the computing system 100 externally. According to the embodiment, various types of device drivers 224 are implemented. Examples of the type of drivers 224 include a kernel-mode device driver, 1 user-mode device driver, and a virtual device driver.

The one or more applications, in accordance with the embodiment, are in communication with one or more system services. Examples of the services include program execution, I/O operations, file system manipulation, communication, error detection resource allocation, and protection.

An application, as shown in FIG. 2, is connected with the device drivers 224, one or more services 228, and security system 226. If application 202 is attacked by any kind of threat from threat command center 204 via network interface 206, application 202 may get infected and start malfunctioning. Computing system 100 implements the security system 226 to monitor, detect and prevent malicious attacks. Security system 226 detects malicious behavior of a suspicious application 202 and analyses one or more aspects of the application related to the malfunction or threat to determine the nature of the malware. In one embodiment, security system 226 is trained to detect a rootkit. Upon detection of the rootkit, a rootkit detection alert 228 is sent to computing system 100.

Figure 3:
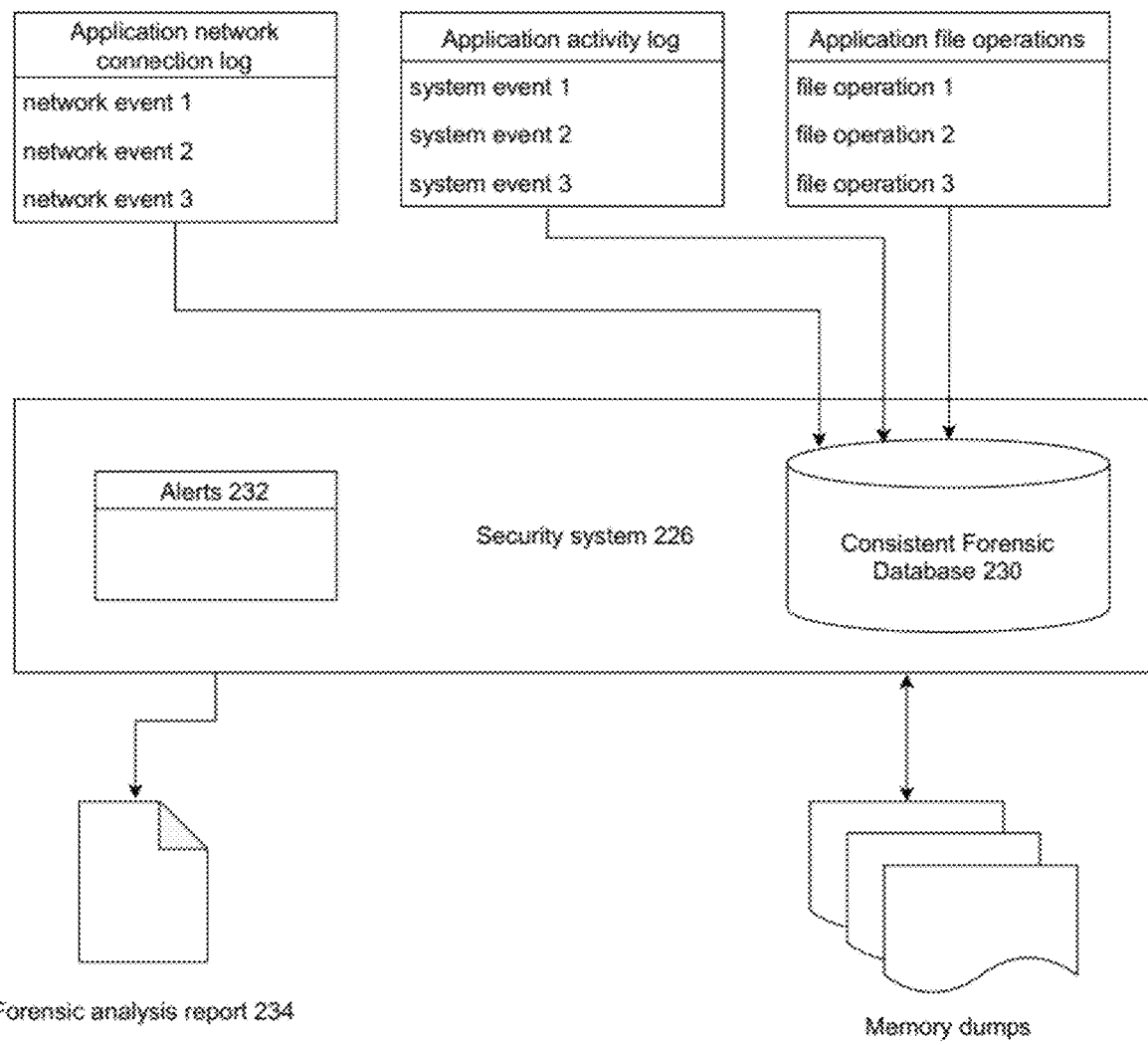
FIG. 3 illustrates a functional block diagram for implementation of the security system, in accordance with the embodiment.

Security system 226 is described in FIG. 3. Security system 226, according to an embodiment, is coupled to a consistent forensic database 230 implemented to store source data, such as data related to the application network connections, application file operations, and application activity event logs. Consistent forensic database 230 also includes classified data objects representing training data, test data, or classified source data. In one embodiment, the source data is provided as a real-time stream to consistent forensic database 230. In an implementation, the source data is a collection of data types, such as, data stored in a database, file system, or the like, or combination thereof. In one implementation, the source data is pre-processed before it is provided to consistent forensic database 230 for storage.

In one implementation, to store various types of source data, consistent forensic database 230 is configured to store various types of files, such as text, spreadsheets, folders, and the like. Consistent forensic database 230 is further configured to maintain and store user account identifiers, user profiles, email addresses, IM addresses, or other network addresses. Consistent forensic database 230 may further include program code, data, algorithms, and the like, for use by a processor device, such as processor to execute and perform actions, such as storage and retrieval of the stored data.

In accordance with one embodiment, the consistent forensic database 230 is coupled to a security cloud service to store forensic data. Forensic data refers generally to data characterizing the state of events or files or objects or metadata in a computing environment of one or more endpoint computers. Data relating to artifacts and events on an endpoint computer are types of forensic data. Forensic data therefore includes data generally or more specifically data relating to events occurring within an operating environment of an endpoint computer system.

A cloud storage system may include one or more servers for providing cloud storage services to users on client devices. For example, a cloud storage system may include several data servers for storing several files for users of the cloud storage system. The cloud storage system may store many such files in total for several users. Files that are stored in the cloud storage system may include word processing documents, spreadsheets, presentations, pictures, music, videos, and a variety of other file formats. The forensic data of consistent forensic database 230 is stored on the cloud storage system.

FIG. 3 illustrates a generic block diagram of a security system 226, in accordance with one embodiment. According to the embodiment, computing system 100 is monitored by security system 226 in either real-time, on demand, or on a schedule, to receive attributes related to at least one or the application activity events log, the application network connections log, the application operation files log, or a combination of these logs.

In one implementation, the application activity events log contains a list of activities performed by the one or more applications. Examples of an event include login into an application, capturing data using a capturing application, accessing a web-link, and the like. Considering external peripheral devices connected to the computing system 100, the event may be an access door unlocking or locking, capturing data using CCTV cameras, accessing and controlling network devices or storage devices connected to computing system 100. The events are sent in any number of formats to the application activity events log. The application activity log, in one implementation, is configured to create a log of system events. The security system, according to an embodiment, is configured to receive event related information from the application activity events log. The security system can integrate with the operating system to monitor various log entries, such as authentication events.

In accordance with an implementation, the application operation file log may contain a list of one or more file types and file formats. In an exemplary implementation, the file type refers to a specific type of file or a file with a specific function. For example, Microsoft® Word, OpenOffice Write, Adobe® PDF, LaTeX, WordPerfect, Microsoft® Works, Adobe® Photoshop, etc. File types can be categorized as one or more of: word processing, spreadsheet, archive, compressed, computer-aided design (CAD), database, document, etc. File format refers to the way information is encoded for storage in a file. As such, for a given file type, multiple file formats may be available (i.e., a single file, of a single file type, can be encoded using any of a variety of applicable file formats). Example file formats include (but are not limited to) Extensible Markup Language (XML), Open XML, and Object Linking and Embedding (OLE2). As an example, a Microsoft® Word file type can have either an XML file format (.docx) or an OLE2 file format (.doc).

In one embodiment, computing system 100 may communicate with at least one computing device or a server with a specific network address. The network connection is a private network or a public network. A log of each network connection and processes involved in the network connections is maintained. It can be understood by a person skilled in that art that data transmission between two endpoints carries a source IP address and a destination IP address. The Internet Protocol allows any one computer to find any other computer on the Internet by knowing only one thing about the remote computer: the Internet Protocol network address associated with that remote computer. Each computer on the Internet generally must have a unique IP Address. When data packets are broadcast to the Internet identifying the IP Address of the intended recipient, devices with knowledge of network topography determine where to send the packets. When the destination machine receives the data packets, it verifies that the packet is intended for it by examining the destination IP Address stored in the Internet Protocol packet header, and disregards packets that are not intended for it. Security system 226, in one implementation, is configured to store the IP addresses. Therefore, if rootkit is detected, by traversing the network connection logs and the corresponding IP addresses, the security system can identify a source of the rootkit infection.

A network may be connected via wireless links. The wireless links may also include any cellular network standards to communicate among mobile devices. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The geographical scope of the network may vary widely, and network can be a body area network (BAN), a personal area network (PAN), a local-area network (LAN), e.g., Intranet, a metropolitan area network (MAN), a wide area network (WAN), or the Internet. The topology of network 104 is of any form and may include, e.g., any of the following: point-to-point, bus, star, ring, mesh, or tree. The network may be an overlay network which is virtual and sits on top of one or more layers of other networks. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network may be a type of broadcast network, a telecommunications network, a data communication network, or a computer network.

Referring to FIG. 3, the consistent database is configured to store at least one of the application activity events logs, the application network connections log, and the application operation files logs, or the combination thereof, to perform analysis. In one implementation, static analysis is performed on the application data. According to one embodiment, the static analysis is automated through a process of decompiling the application data and extracting a rudimentary form of the original source code which may further be represented in textual or binary. For example, as text or binary code. Basic application functionality is decompiled while remaining agnostic to the underlying code specifics. These basic application functions may include, hut may not be limited to, API calls, direct method invocations, string constants and interface API invocations for HTTP, SMS, network, and GPS. Analyzing the decompiled basic functionality instead of entire application data may save operational time and cost of the security system.

Further, according to the embodiment, the consistent forensic database 230 is also configured to store entities including an application network connection log, an application event activity log and an application file operation log, according to one embodiment.

A memory dump involves capturing all the information stored in the random-access memory (RAM) and writing it to a storage drive. The memory dumps are typically used to gather diagnostic information after a crash for troubleshooting purposes. Using the built-in kernel functions of the operating system, the systems and methods described herein involve producing at least two memory dumps referred to as first memory dump which may be raw dumps associated with clean kernel function, and a second memory dump which may be system dumps associated with infected kernel function. The information captured by the memory dump may include the code image of the malicious content suspect, content of a memory region that has been allocated by the malicious content suspect (e.g., heaps, threads, context), data accessed by the malicious content suspect, embedded content extracted or downloaded during the execution, such as a file or another executable binary, as well as information identifying certain activities performed by the malicious content suspect.

The security system may perform analysis based on the source data and one or more memory dumps stored at consistent forensic database 230 to determine the presence of the rootkit infection. Upon rootkit detection, the security system may generate an alert 232 to take curative measures against the rootkit attack. In one embodiment, a forensic analysis report 234 is generated by the security system. The security system is described in more detail with reference to FIG. 4.

Figure 4:
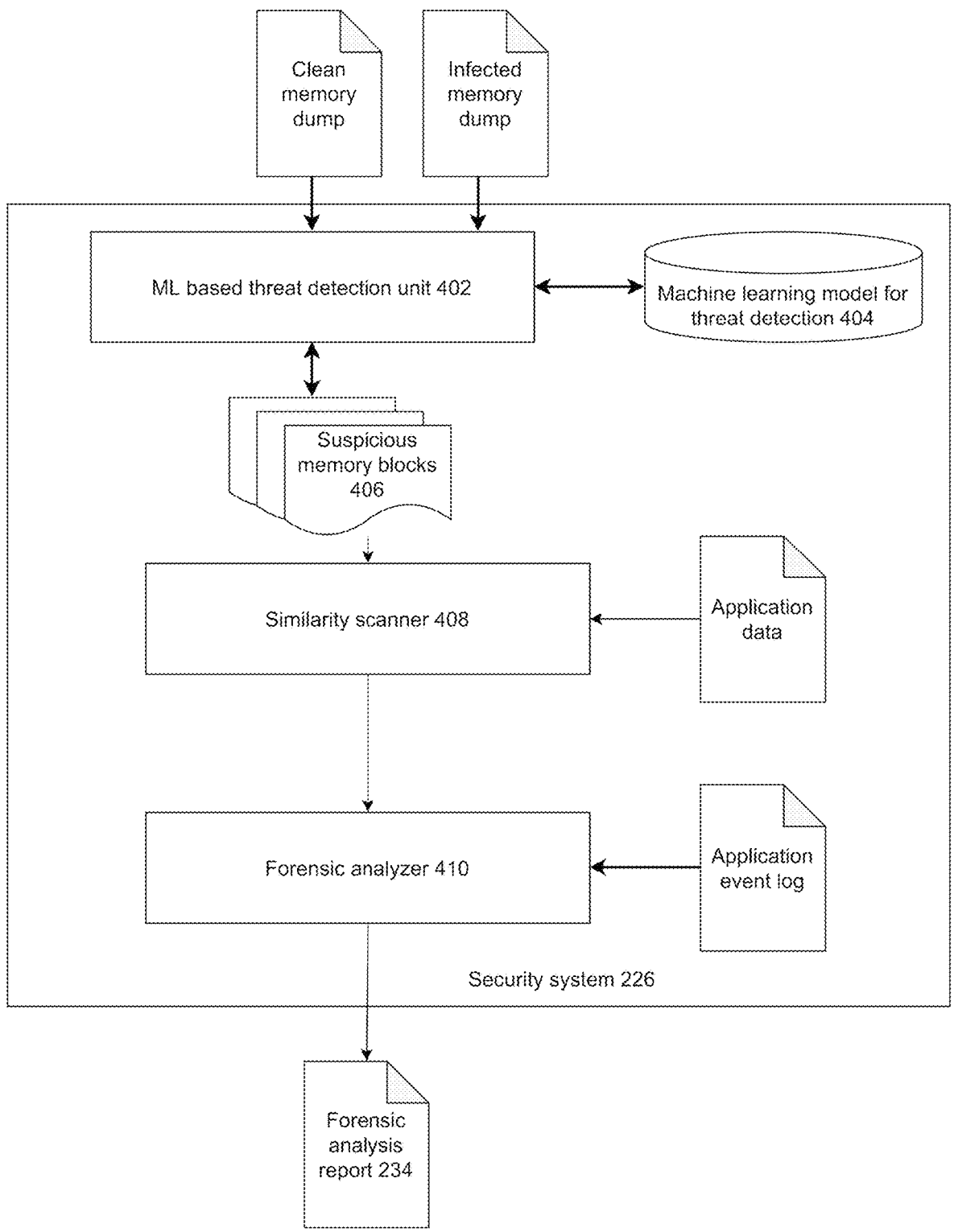
FIG. 4 describes functional components of the security system, in accordance with the embodiment.

FIG. 4 illustrates functional blocks describing the security system, in accordance with one embodiment. Security system 226 includes a threat detection unit 402, a machine learning model 404, a similarity scanner 408, and a forensic analyzer 410. Security system 226 is configured to monitor the one or more applications running on computing system 100 and determine if any process of application 202 has been attacked by the rootkit. Such applications are denoted as suspicious applications.

According to one embodiment, threat detection unit 402 is based on a machine learning model and configured to detect the rootkit threat by analyzing consistent footprints of the computing system.

Threat detection unit 402, in one implementation, is configured to receive the system dump generated by the processor and captured by an event capture driver and data related to the entities including an application network connection log, an application event activity log and an application file operation log. The data is provided to the machine learning model for analysis and identification of suspicious memory blocks from the data.

Machine learning model 404, in one implementation, is based on the Siamese neural network. The Siamese neural network is a type of artificial neural network that consists of two identical neural subnets with the same set of weights. This type of network allows a user to compare the vectors of features of two objects in order to highlight their semantic similarity or difference. Siamese neural network is a non-linear display of data with the aim of bringing similar objects closer to each other and spreading different objects as far as possible. This type of machine learning model 404 allows a user to compare data of different types and determine their relationship. In one implementation, a Triplet network is implemented. The triplet network compares clean and infected dumps with system requests or buffers in I/O operation and can produce a model that can determine the significant features of the buffer that identifies threats with less false positives.

Machine learning model 404, in other embodiment, includes a set of supervised learning algorithms, such as Boosted Decision Trees, Support Vector Machines, and Gaussian Mixture Models. The machine learning model 404s are specified in a predefined configuration or by a user. Machine learning model 404 receives the extracted features as inputs and produces scores as outputs for each input. The scores are produced using the provided feature vector as input to the specified model and model configuration (e.g., Support Vector Machine with a trained SVM model). A statistical confidence is associated with detection events for indicating the effectiveness of potential remediation policy or actions. In one embodiment of this invention, the training process may include generation of statistics associated with the accuracy and performance of machine learning model 404 wherein the statistics include the statistical means of the predicted output scores for positive and negative samples. For example, the statistics include a network traffic training score based on similarity to malicious behavior by software executing on a network-connected host system, a second network traffic training score based on similarity to benign behavior by software executing on a network-connected host system, and a network traffic training score based on similarity to malicious behavior associated with specific classes of malware. The statistics may also include statistical standard deviations of the predicted output scores for positive and negative samples.

According to an embodiment, the machine learning model 404 is trained to cluster system dumps as suspicious. System dumps can be whole system memory image or application memory pages or filtered system dumps. The machine learning model 404 analyzes all data in view of different machine learning algorithms. In an implementation, the machine learning model 404 is configured to compare the first data input and the second data input, wherein the first data input may correspond to a clean system state and the second data input may correspond to an infected system state The suspicious system state may indicate that the system might have been infected and may require further analysis for rootkit detection. Memory blocks corresponding to the suspicious system state are shared with the similarity scanner 408 for further analysis, according to embodiment, to find similarity between application data and the suspicious memory block. Similarity between two data files indicates a rootkit infection.

Similarity scanner 408 is implemented to find at least one thread which is the source of the malicious content. Similarity scanner 408 compares and finds similarities between the application data and the suspicious memory blocks to identify the source of the rootkit infection.

Forensic analyzer 410, in accordance with one embodiment, is configured to access consistent forensic database 230 containing the data related to the entities, such as the application activity events log, the application network communications log, and the application operation file logs. Operational processes or network connections of the computing system that may have been initiated by or responded to the malicious thread is analyzed further to identify if any process or network connection is infected or not.

Figure 5:
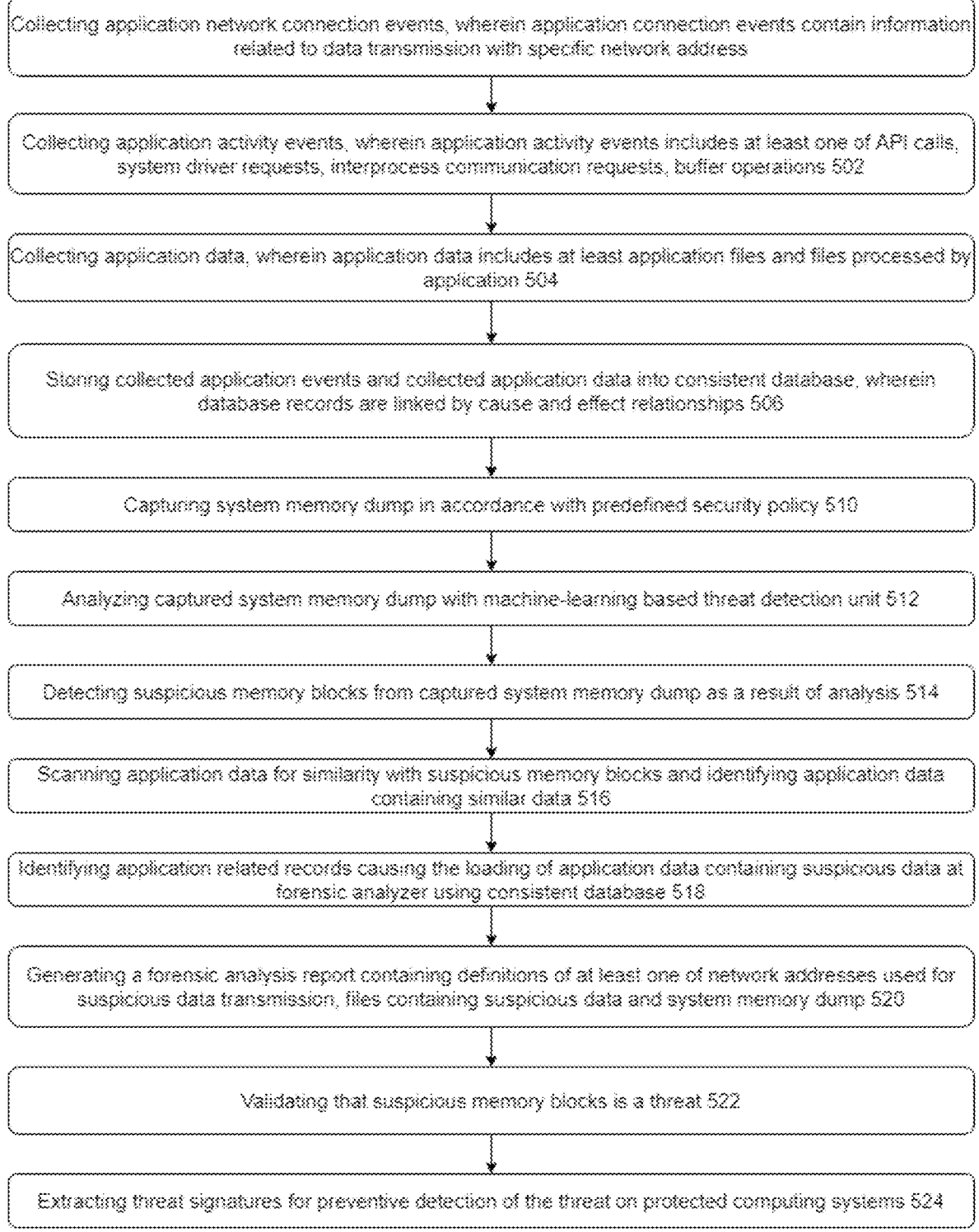
FIG. 5 describes a method block diagram for the security system implementation, in accordance with the embodiment.

FIG. 5 describes a method 500 implemented for performing forensic analysis on consistent system footprints for rootkit detection, according to one embodiment. Method 500 mainly includes collection of a source data, training a machine learning model 404 to analyze the source data and to detect a suspicious memory block, and performing forensic analysis on the suspicious memory blocks.

At block 502, data defining the application network connections log is collected by the security system. The application network connections log may contain information related to data transmission with specific network address, in one implementation.

At block 504, data defining the application activity events log is collected by the security system. The examples of the application activity events may include but may not be limited to API calls, system driver requests, inter-process communication requests, and buffer operations.

At block 506, application data related to file and files processed by the application is collected by the security system.

At block 508, data related to the application activity events, the application network connections, and the application operation files is stored into a consistent forensic database 230. In one implementation, the database records are linked by cause-and-effect relationships.

At block 510, at least one memory dump is captured by a hardware processor and collected by the security system. In one implementation, first memory dump and second memory dump are captured and stored according to the predefined security policy.

At block 512, the first and second memory dumps are analyzed by the threat detection unit 402 based on a machine learning model 404. The memory dumps are mainly analyzed to determine a suspicious memory block. The suspicious memory block is identified by the machine learning model 404.

At block 514, suspicious memory blocks are detected as a result of analysis performed by block 512.

At block 516, to find similarity between the application data and the suspicious memory blocks, the application data is scanned by the similarity scanner 408. Whether the application data contains similar data as the suspicious memory block is identified.

At block 518, a forensic analysis report is generated by the forensic analyzer 410. The forensic analysis report 234 contains definitions of at least one of network addresses used for suspicious data transmissions, files containing suspicious data and system memory dump.

At block 520, the suspicious memory block is validated as a threat.

At block 522, threat signatures are extracted for preventive detection of the threat on a protected computing system.

The invention claimed is:

1. A security system to perform real-time forensic analysis on a running computing system to detect a thread infected with rootkit code comprising:
a processor operably coupled to a memory and a storage medium;
a system event monitor, under control of the processor, for intercepting and collecting application data in real time in the running computing system, including an application network connection log, an application event activity log and an application file operation log;
a kernel-mode system memory dump capture driver, under control of the processor, configured to capture a system memory dump;
a consistent database, in the storage medium, to receive the application data in real time from the system event monitor for storage;
a threat detection unit, under control of the processor, having a machine learning model, for analyzing system dumps, the machine learning model having been trained on clean memory dumps and memory dumps infected with a plurality of rootkit codes, and the threat detection unit being configured to:
receive the system memory dump from the system dump capture driver;
analyze, using the machine learning model, the system memory dump to determine a suspicious memory block;
compare the suspicious memory block with real-time application data in the consistent database, using a similarity scanner to determine a suspicious thread in the application data that is similar to a thread in the suspicious memory block;
analyze, using a forensic analyzer, the application log data in the consistent database and the suspicious thread to detect activity of an application related to the suspicious thread; and
send an alert to the running computer system and classify the running system state as infected by a rootkit upon detection of the activity of the application related to the suspicious thread.

2. The system of claim 1, wherein the system memory dump is broken down in smaller compartmentalized sections including textual representation and binary representation.

3. The system of claim 1, wherein the forensic analyzer is configured to perform analysis on the suspicious memory block in conjunction with the application event activity log in the consistent database to determine if the memory block is infected.

4. The system of claim 1, wherein threat detection unit is configured for static analysis of the system memory dumps.

5. The system of claim 1, wherein the similarity scanner is further configured to detect a malware process, a network address, and vulnerable driver through which the rootkit was loaded into the system.

6. The system of claim 1, wherein the application event activity log comprises one or more system drivers file operations, one or more process interconnections, one or more buffer operations, one or more network communication related to running applications, one or more Application Programming Interface calls, and one or more system driver requests.

7. The system of claim 1, wherein a log of operations is generated by the system event monitor to determine the relationship between a detected rootkit infection and a thread that initiated the rootkit infection.

8. The system of claim 1, wherein the machine learning model has been further trained on a collection of known malwares, corresponding to a rootkit family, and clean files, corresponding to one or more memory dumps of an uninfected computing system.

9. The system of claim 1, wherein the system drivers operate in kernel mode.

10. The system of claim 1, wherein a rootkit detection alert is generated upon suspicious thread detection.

11. The system of claim 1, wherein a forensic report is generated as a result of forensic analysis.

12. A method for implementing a security system to perform forensic analysis in a live computing system to detect a thread infected with rootkit code, the method comprising the steps of:

intercepting and collecting application data in real time in the live computing system, including an application network connection log, an application event activity log and an application file operation log related to the computing system;

capturing a system memory dump of the computing system by a kernel-mode system dump capture driver;

receiving the application data from a system event monitor in real time, by a consistent database, for storage;

analyzing, using a machine learning model of a threat detection unit, the machine learning model having been trained with clean memory dumps and memory dumps infected with rootkit code, the system memory dump to determine a suspicious memory block;

comparing the suspicious memory block with the application data in the consistent database, using a similarity scanner of the threat detection unit, to determine a suspicious thread in the application data that is similar to a thread in the suspicious memory block;

analyzing, using a forensic analyzer of the threat detection unit, the application logs in the consistent database and the suspicious thread to detect activity of an application related to the suspicious thread;

classifying, by the threat detection unit, a system state as infected by a rootkit upon detection of the application related to the suspicious thread; and sending an alert to a recipient in the live computing system indicating the infected system state.

13. The method of claim 12, wherein the system dump is broken down in smaller compartmentalized sections including textual representation and binary representation.

14. The method of claim 12, wherein the forensic analyzer is configured to perform analysis on the suspicious memory block in conjunction with the application event log to determine if the suspicious memory block is infected.

15. The method of claim 12, wherein static analysis is used to analyze the system memory dumps.

16. The method of claim 12, wherein the system is further configured to detect a malware process, a network address, and a vulnerable driver through which a rootkit was loaded into the system.

17. The method of claim 12, wherein the application event activity log comprises one or more system drivers file operations, one or more process interconnections, one or more buffer operations, one or more network communication related to running applications, one or more Application Programming Interface calls, and one or more system driver requests.

18. The method of claim 12, wherein a log of operations is generated by the system event monitor to determine the relationship between the detected rootkit infection and the thread that initiated the rootkit infection.

19. The method of claim 12, further comprising generating a rootkit detection alert upon detecting the application related to the suspicious thread.

20. The method of claim 12, further comprising generating a forensic report as a result of forensic analysis.

\* \* \* \* \*